United States Patent
Byoun et al.

(10) Patent No.: US 10,242,698 B1
(45) Date of Patent: Mar. 26, 2019

(54) DATA STORAGE DEVICE REGULATING BEMF POWER VOLTAGE DURING POWER FAILURE

(71) Applicant: Western Digital Technologies, Inc., San Jose, CA (US)

(72) Inventors: Jaesoo Byoun, Irvine, CA (US); Brian A. Johnson, Laguna Hills, CA (US); Timothy A. Ferris, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/956,990

(22) Filed: Apr. 19, 2018

(51) Int. Cl.
*G11B 5/09* (2006.01)
*G11B 5/012* (2006.01)
*G11B 5/82* (2006.01)
*G11B 5/33* (2006.01)
*G11B 19/20* (2006.01)

(52) U.S. Cl.
CPC .............. *G11B 5/012* (2013.01); *G11B 5/33* (2013.01); *G11B 5/82* (2013.01); *G11B 19/2054* (2013.01)

(58) Field of Classification Search
None
See application file for complete search history.

(56) References Cited

U.S. PATENT DOCUMENTS

| | | | |
|---|---|---|---|
| 4,970,610 A * | 11/1990 | Knappe | G11B 5/5521 360/73.03 |
| 5,414,861 A | 5/1995 | Horning | |
| 5,438,549 A | 8/1995 | Levy | |
| 5,589,996 A * | 12/1996 | Patrick | G11B 19/20 360/71 |
| 5,889,629 A * | 3/1999 | Patton, III | G11B 5/54 360/69 |
| 6,160,368 A | 12/2000 | Plutowski | |
| 6,549,359 B1 * | 4/2003 | Bennett | G11B 19/22 360/69 |
| 6,577,465 B1 | 6/2003 | Bennett et al. | |
| 6,594,102 B1 | 7/2003 | Kanda et al. | |
| 6,754,025 B1 * | 6/2004 | Shepherd | G11B 25/043 360/51 |
| 6,856,556 B1 | 2/2005 | Hajeck | |
| 6,970,319 B1 | 11/2005 | Bennett et al. | |
| 7,623,316 B1 | 11/2009 | Rana et al. | |
| 7,733,712 B1 | 6/2010 | Walston et al. | |
| 7,974,038 B2 | 7/2011 | Krishnan et al. | |
| 8,630,054 B2 | 1/2014 | Bennett et al. | |
| 8,970,977 B1 * | 3/2015 | Agness | G11B 21/12 360/55 |
| 8,988,805 B1 * | 3/2015 | Blair | G11B 20/1217 360/48 |
| 9,424,868 B1 * | 8/2016 | Nicholls | G11B 5/5582 |
| 2008/0111423 A1 | 5/2008 | Baker et al. | |
| 2009/0140575 A1 | 6/2009 | McGee et al. | |

(Continued)

*Primary Examiner* — Peter Vincent Agustin (57) ABSTRACT

A data storage device is disclosed comprising a head actuated over a disk, and a spindle motor configured to rotate the disk, wherein the spindle motor comprises a plurality of windings. During a power failure the head is unloaded by generating a periodic signal, shorting the windings of the spindle motor based on the periodic signal in order to generate a power voltage, and adjusting the periodic signal based on an amplitude of the power voltage.

27 Claims, 6 Drawing Sheets

(56) References Cited

U.S. PATENT DOCUMENTS

2009/0206657 A1     8/2009  Vuk et al.
2009/0289607 A1    11/2009  Mentelos
2015/0194805 A1*    7/2015  Sagasaki ............ G05B 19/4062
                                                    318/569

* cited by examiner

DATA STORAGE DEVICE REGULATING BEMF POWER VOLTAGE DURING POWER FAILURE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
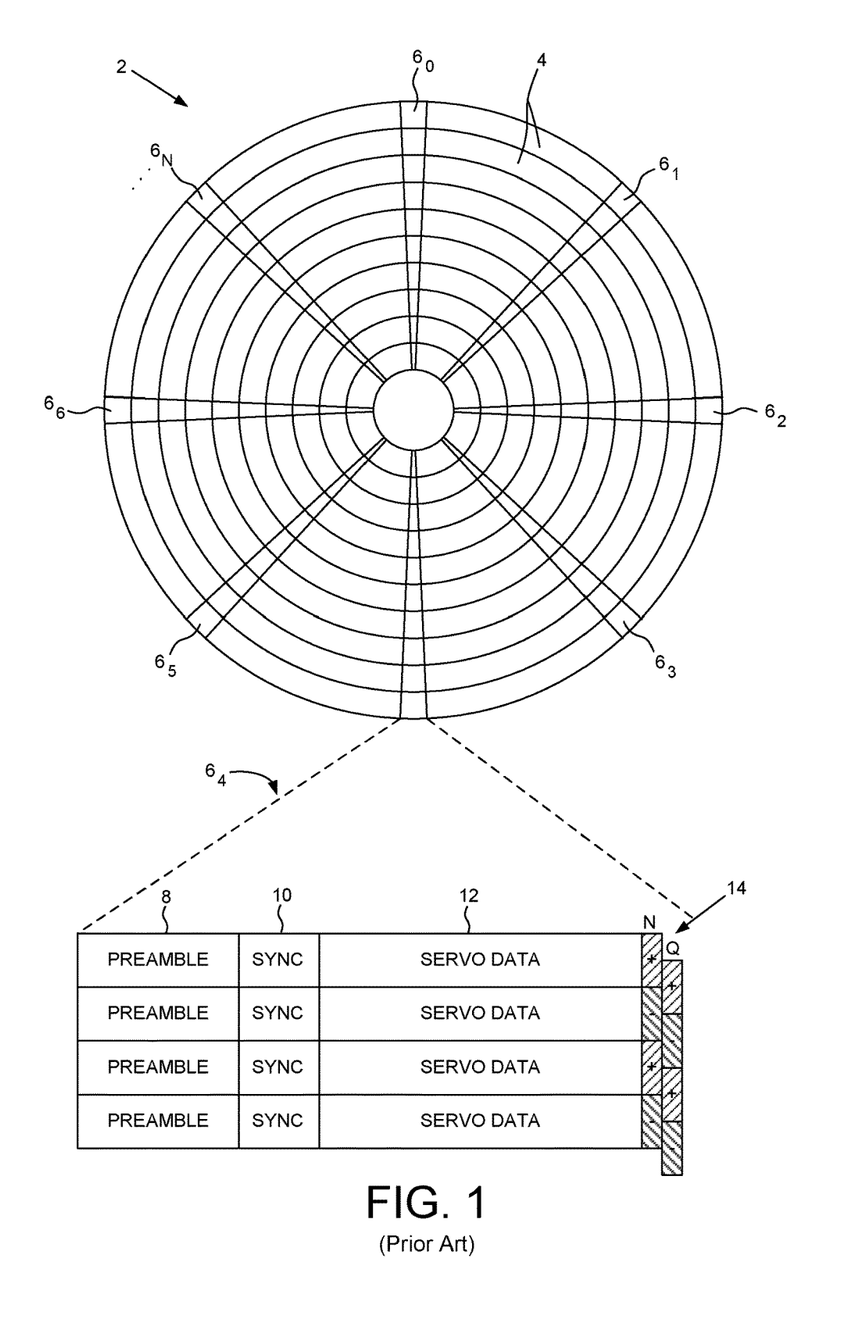
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
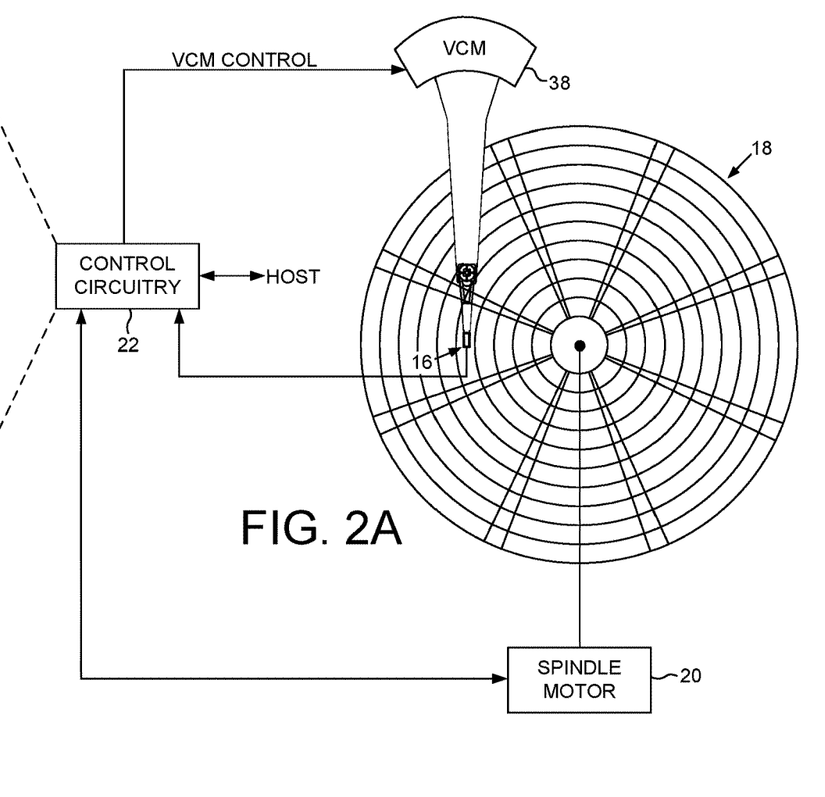
FIG. 2A shows a data storage device in the form of a disk drive comprising a head actuated over a disk, and a spindle motor configured to rotate the disk.
Figure 2B:
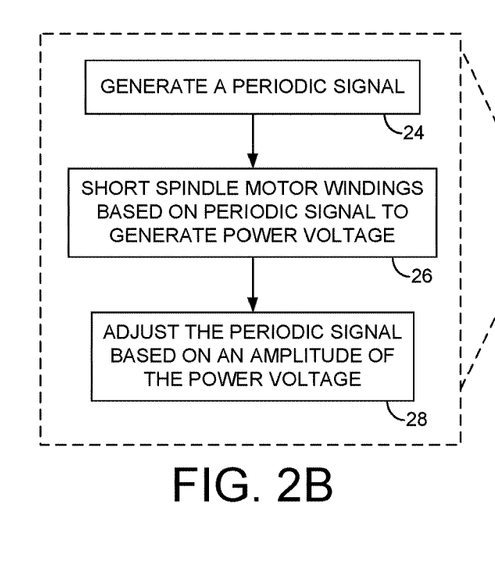
FIG. 2B is a flow diagram according to an embodiment wherein during a power failure a periodic signal is used to short the windings of the spindle motor to generate a a power voltage from a back electromotive force (BEMF) voltage of the spindle motor, wherein the periodic signal is adjusted based on an amplitude of the power voltage.

FIG. 2A shows a data storage device in the form of a disk drive according to an embodiment comprising a head 16 actuated over a disk 18, and a spindle motor 20 configured to rotate the disk 18, wherein the spindle motor comprises a plurality of windings. The disk drive further comprises control circuitry 22 configured to unload the head 16 during a power failure by executing the flow diagram of FIG. 2B. A periodic signal is generated (block 24), and the windings of the spindle motor are shorted based on the periodic signal in order to generate a power voltage (block 26), wherein the periodic signal is adjusted based on an amplitude of the power voltage (block 28).

Figure 3:
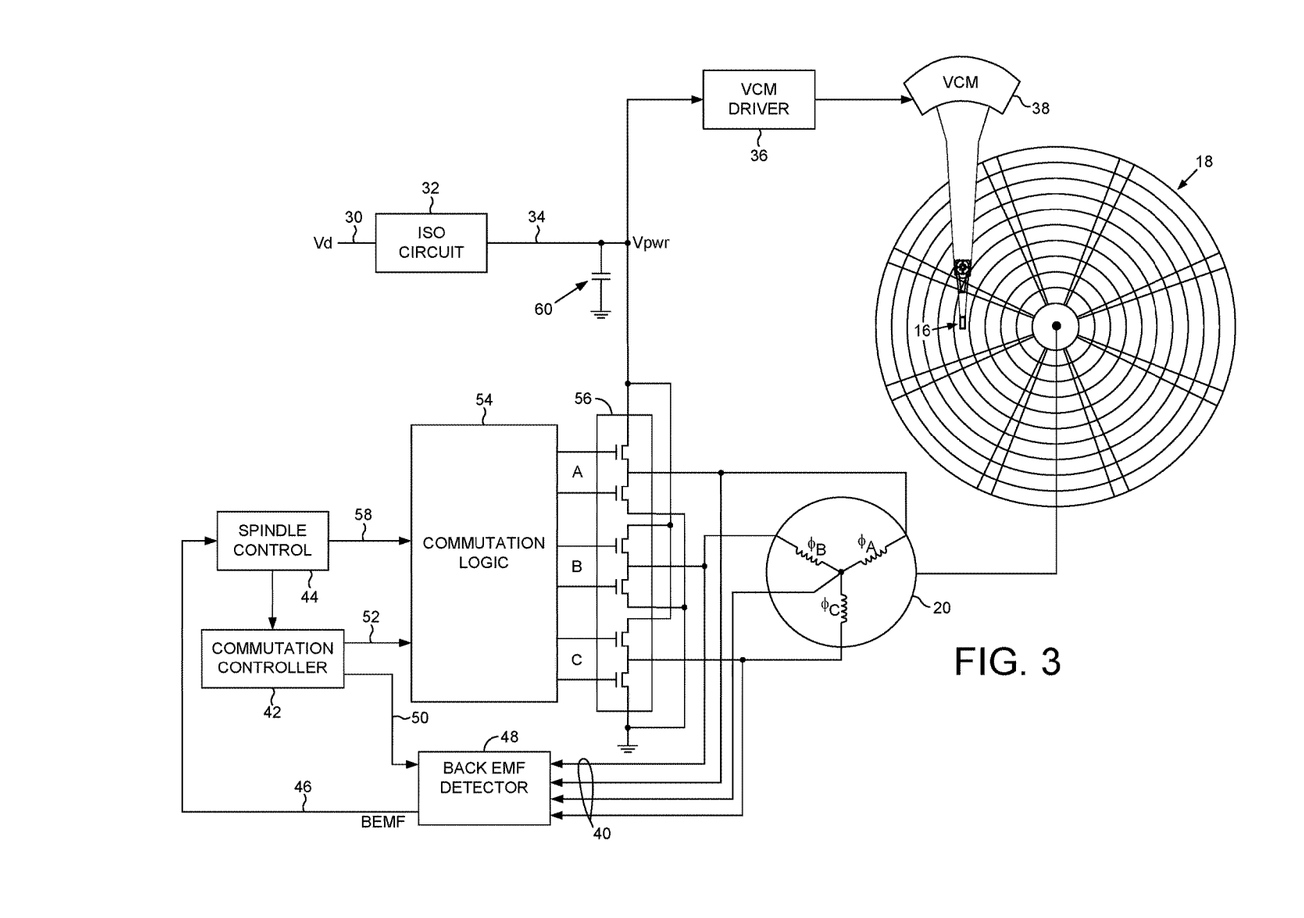
FIG. 3 shows control circuitry according to an embodiment for commutating the spindle motor, wherein during a power failure the power voltage is used to power a voice coil motor (VCM) in order to unload the head.

FIG. 3 shows control circuitry 22 according to an embodiment wherein during normal operation, the disk drive receives a supply voltage 30 from a host which passes through an isolation circuit 32 to become a power voltage Vpwr 34 used to power the disk drive, including to power a VCM driver 36 for controlling a VCM 38 that actuates the head 16 over the disk 18. The power voltage Vpwr 34 also powers spindle control circuitry configured to commutate the spindle motor 20 in order to rotate the disk 18. When the disk drive is powered down normally, the head 16 may be unloaded off the disk onto a ramp mounted at the outer diameter of the disk 18.

A back electromotive force (BEMF) voltage 40 generated by the windings of the spindle motor 20 may be processed in order to drive the commutation sequence of a commutation controller 42. A spindle control block 44 may process a BEMF signal 46 which may be a square wave representing the BEMF zero-crossings as detected by a BEMF detector 48. The commutation controller 42 may generate a control signal 50 which configures the BEMF detector 48 to detect the zero-crossing of the BEMF voltage generated by each winding as the disk rotates. The commutation controller 42 also generates a control signal 52 applied to commutation logic 54. In the embodiment of FIG. 3, the commutation logic 54 is configured by the control signal 52 to control the state of switches 56 in order to drive the windings with voltage Vpwr 34. The commutation logic 54 may operate in any suitable manner, such as by driving the switches 56 as linear amplifiers that apply continuous-time sinusoidal voltages to the windings. In another embodiment, the commutation logic 54 may drive the switches 56 using pulse width modulation (PWM), such as using square wave PWM, trapezoidal PWM, or sinusoidal PWM. Regardless as to how the windings are driven, the commutation controller 42 generates the control signal 52 so that the windings are commutated at the correct periods, thereby generating the desired rotating magnetic field that causes the spindle motor to rotate. In one embodiment, the spindle control block 44 may generate a control signal 58 that controls the effective amplitude of the periodic driving voltage applied to the windings (continuous or PWM), thereby controlling the speed of the spindle motor 20.

If a power failure occurs while the disk 18 is spinning, there is residual kinetic energy as the disk 18 continues to rotate the spindle motor 20, and therefore the spindle motor 20 can be converted into a power generator used to power the control circuitry 22 while executing power down operations, such as completing a current write operation to the disk 18 before unloading the head 16 onto the ramp. During the power failure, the isolation circuit 32 isolates the windings of the spindle motor 20 from the supply voltage 30 to prevent current from back flowing into the supply voltage 30. Any suitable isolation circuit 32 may be employed, such as a diode or a field effect transistor (FET) operated as a switch.

A known technique for generating the voltage Vpwr 34 during a power failure is to periodically short the windings of the spindle motor, wherein shorting the windings applies a braking force to the spindle motor and causes current to build in the windings due to the inductance and the BEMF voltage. At the end of the shorting interval, the current stored in the windings charges a capacitor 60 to generate (boost) the voltage Vpwr 34. An example of this prior art technique is disclosed in U.S. Pat. No. 6,577,465 entitled "DISK DRIVE COMPRISING SPIN DOWN CIRCUITRY HAVING A PROGRAMMABLE SIGNAL GENERATE FOR ENHANCING POWER AND BRAKING CONTROL," the disclosure of which is incorporated herein by reference. In the '465 patent, the boost/brake action of periodically shorting the windings of the spindle motor may boost the voltage Vpwr 34 to an unsafe level that can damage the control circuitry. To prevent damage due to an over-voltage condition, the isolation circuit clamps the voltage Vpwr 34 to a predetermined maximum value.

Figure 4A:
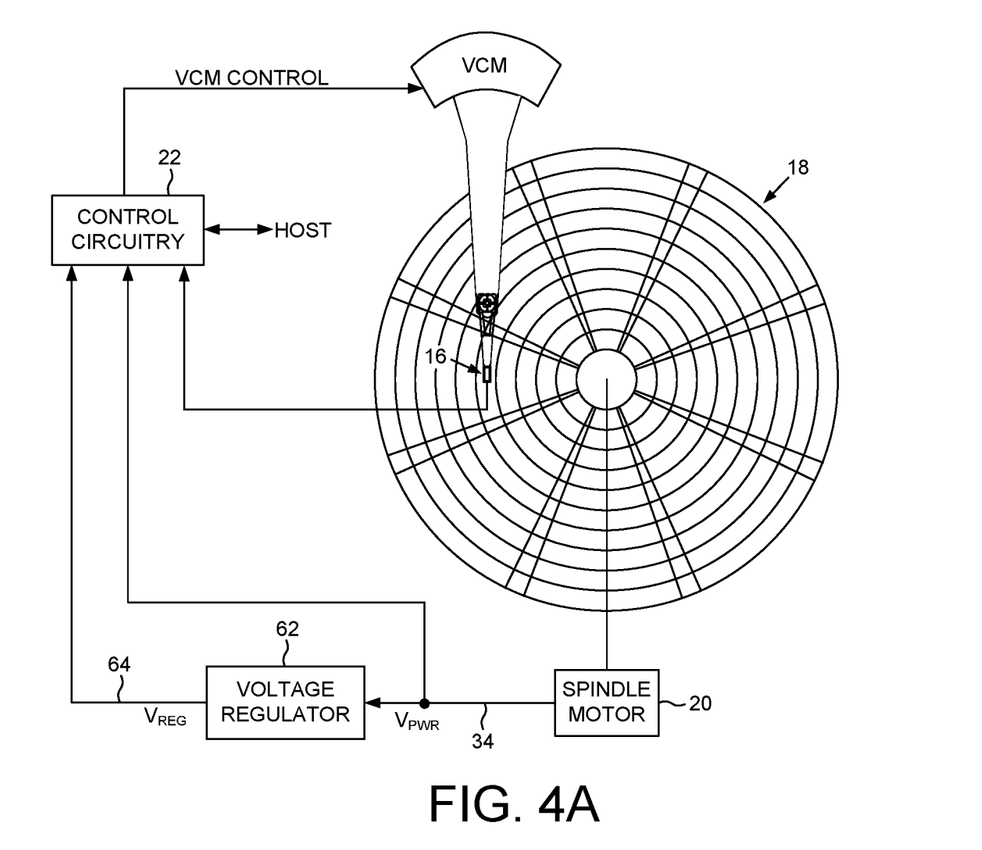
FIG. 4A shows an embodiment wherein a voltage regulator may generate a regulated voltage from the power voltage.
Figure 4B:
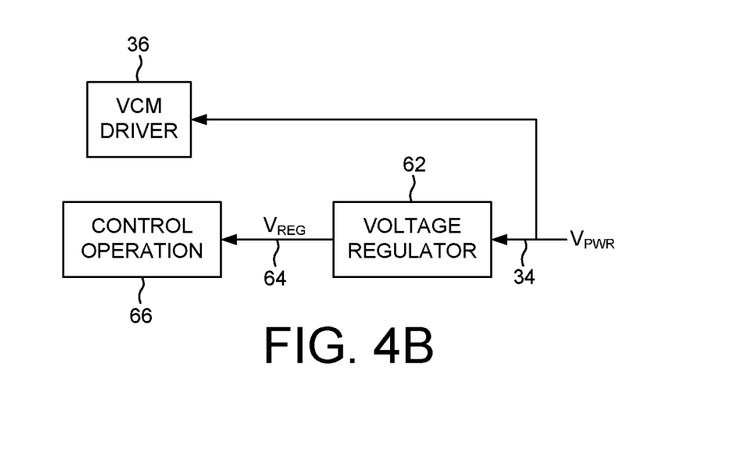
FIG. 4B shows an embodiment wherein the regulated voltage may be used to power control circuitry during a power failure, and the power voltage may be used to power a VCM driver.

FIG. 4A shows an embodiment wherein during a power failure a suitable voltage regulator 62 is configured to generate a regulated voltage 64 based on the voltage Vpwr 34. As shown in FIG. 4B, the regulated voltage 64 may be used to perform various control operations at block 66 during the power failure, such as completing a current write operation (e.g., to the disk or a flash memory). In one embodiment, the control operation performed at block 66 includes adjusting the periodic signal used to short the windings of the spindle motor based on the amplitude of the power voltage (the voltage Vpwr 34). In one embodiment, adjusting the periodic signal based on the amplitude of the power voltage helps prevent the power voltage from reaching the clamping level, thereby using the kinetic energy sourced from the spindle motor more efficiently rather than dissipate the energy through the clamping circuit (the isolation circuit 32).

Figure 5:
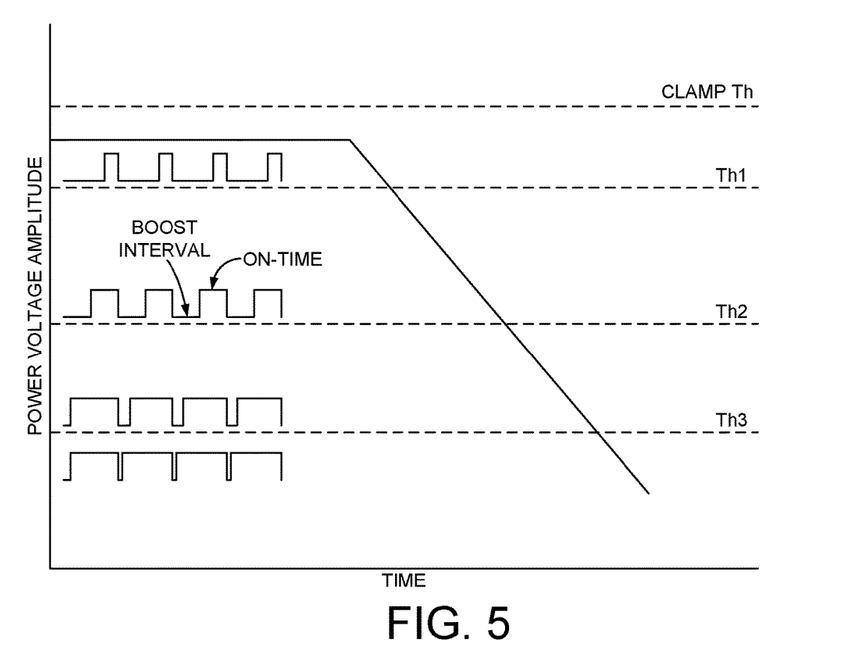
FIG. 5 shows an embodiment wherein the periodic signal comprises a square wave, and a duty cycle of the square wave is increased as the amplitude of the power voltage falls below predetermined thresholds in order to optimize the power sourced from the power voltage during a power failure.

FIG. 5 shows an embodiment wherein the periodic signal used to short the windings of the spindle motor comprises a square wave having an adjustable duty cycle (adjustable "on-time"). At the beginning of the power failure, the amplitude of the power voltage is above a first threshold and so the duty cycle of the square wave is configured to a minimal value to prevent the amplitude of the power voltage from reaching the clamping threshold. When the amplitude of the power voltage falls below the first threshold, the duty cycle of the square wave is incrementally increased so as to increase the boosting effect due to shorting the windings. In this embodiment, the duty cycle is incrementally increased as the amplitude of the power voltage falls below incrementally lower thresholds as illustrated in FIG. 5. At the end of the unload operation, the windings of the spindle motor may be continuously shorted in order to brake the spindle motor at a maximum remaining torque (as well as ensure the head unloads completely onto the ramp).

Figure 6:
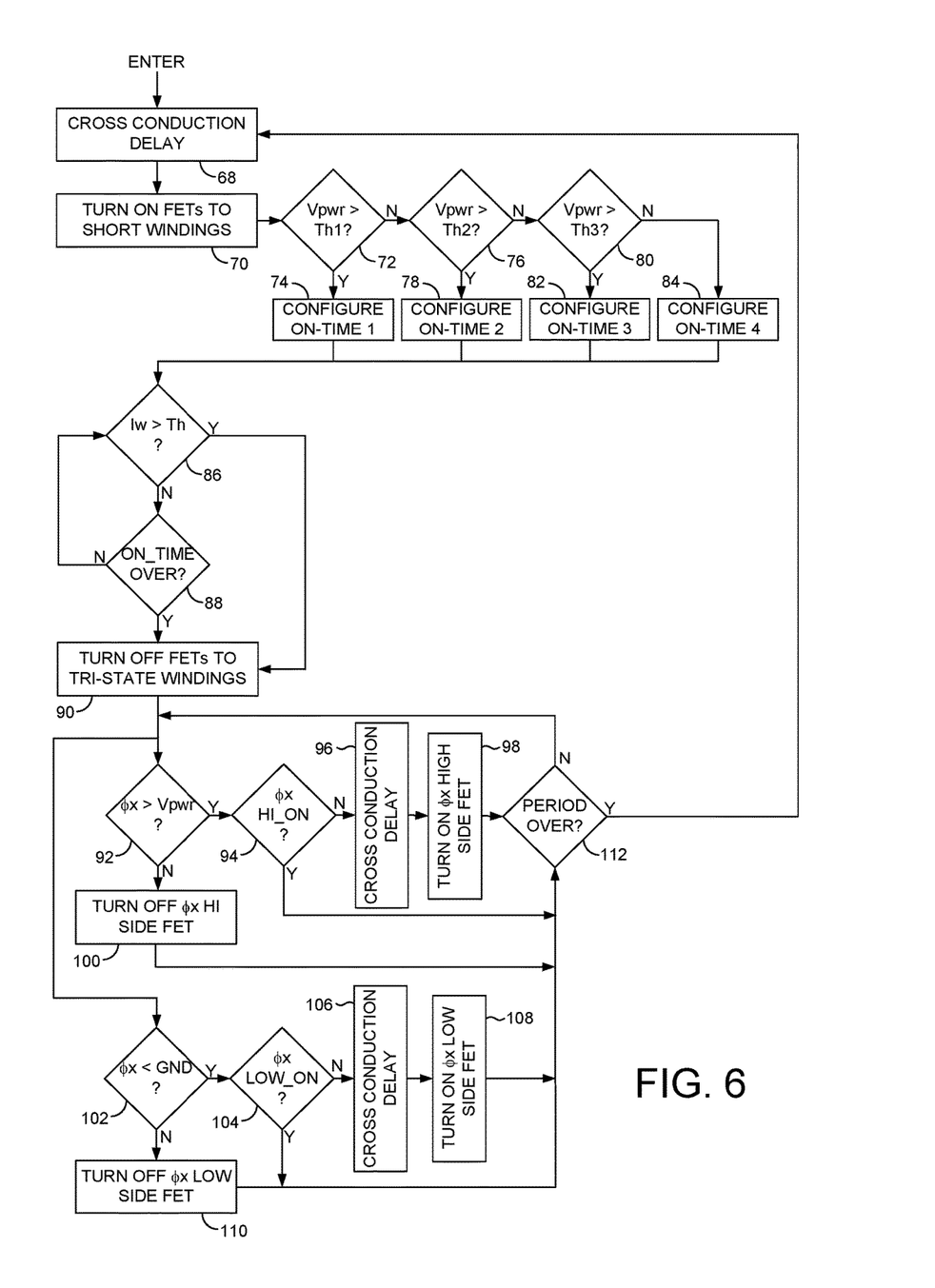
FIG. 6 is a flow diagram executed during a power failure, wherein a duty cycle (on-time) of a square wave used to short the windings of the spindle motor is adjusted based on an amplitude of the power voltage.

FIG. 6 is a flow diagram according to an embodiment wherein when a power failure is detected, the switches 56 in FIG. 3 are tristated for a predetermined delay in order to prevent cross conduction (block 68). After the cross conduction delay, the windings of the spindle motor are shorted (block 70) for an on-time such as shown in FIG. 5. If the power voltage is above a first threshold (block 72) the on-time is set to a first interval (block 74), if the power voltage is between a first and second threshold (block 76) the on-time is set to a second interval (block 78), if the power voltage is between a second and third threshold (block 80) the on-time is set to a third interval (block 82), and if the power voltage is below the third threshold the on-time is set to a fourth interval (block 84). If the current Iw flowing through the windings exceeds a threshold (block 86) or if the on-time interval expires (block 88), the switches 56 in FIG. 3 are tristated (block 90) to begin boosting the power voltage. The voltage across each winding (phase) is detected, and if the voltage across any one winding exceeds the power voltage (block 92) and the corresponding high side switch is off (block 94), then after a cross conduction delay (block 96) the high side switch is turned on (block 98) in order to further boost the power voltage. If the voltage across any one winding is less than (or falls below) the power voltage, the corresponding high side switch is turned off (block 100). If the voltage across any one of winding is less than ground (block 102) and the corresponding low side switch is off (block 104), then after a cross conduction delay (block 106) the low side switch is turned on (block 108) in order to further boost the power voltage. If the voltage across any one winding is higher than (or rises above) ground, the corresponding low side switch is turned off (block 110). The flow diagram is then repeated from block 92 until the end of the boosting interval at block 112 (i.e., until the end of the period of the square wave). The flow diagram is then repeated from block 68 until the end of the power failure operations, wherein in one embodiment the windings of the spindle motor may be continuously shorted until the disk stops spinning.

In the embodiment shown in FIG. 5, the periodic signal is adjusted based on three thresholds; however, other embodiments may employ any suitable number of thresholds. In one embodiment, the threshold voltages for comparing against the power voltage are generated based on the regulated voltage 64 (FIG. 4A) generated from the power voltage. In one embodiment, the voltage regulator 62 may be a step-down regulator such that the regulated voltage 64 is less than the power voltage. In this embodiment, the power voltage may be divided down (e.g., using a voltage divider) in order to compare the power voltage to the voltage thresholds generated using the regulated voltage 64.

The periodic signal for shorting the windings of the spindle motor may be generated in any suitable manner, such as with suitable timers for timing the off-time and on-time of a square wave. In one embodiment, the timer intervals may be adjusted incrementally based on a threshold range of the power voltage, and in another embodiment, the timer intervals may be adjusted continuously based on the amplitude of the power voltage. For example, in one embodiment the power voltage may power inverter elements of a ring oscillator used to time the timer intervals, wherein the delay of each inverter element may vary (e.g., decrease) as the amplitude of the power voltage decreases.

In one embodiment, the periodic signal used to short the windings of the spindle motor may be adjusted by adjusting a period of the periodic signal, thereby adjusting the frequency of the periodic signal. Referring to the example of FIG. 5, in one embodiment the frequency of a square wave may be adjusted based on the amplitude of the power voltage instead of, or in addition to, adjusting the duty cycle of the square wave. For example, in one embodiment the period of the square wave may be decreased (incrementally or continuously) as the amplitude of the power voltage decreases.

Any suitable periodic signal may be used to short the windings of the spindle motor, such as a square wave, triangle wave, sine wave, etc. In one embodiment, the periodic signal may drive the switches 56 shown in FIG. 3 as linear amplifiers in order to control the boosting/braking effect caused by shorting the windings. In this embodiment, the windings may not be shorted completely during the "shorting interval" and/or the degree of shorting may vary over the shorting interval, for example, if the periodic signal comprises a sine wave for driving the switches 56 as linear amplifiers.

In the embodiment of FIG. 5, the duty cycle of the periodic signal (square wave) used to short the windings of the spindle motor may be increased linearly as the amplitude of the power voltage decreases. However, in other embodiments the periodic signal may be adjusted (e.g., duty cycle, period, etc.) based on any suitable function of the power voltage amplitude. For example, the duty cycle of the square wave in FIG. 5 may be increased based on any suitable polynomial function of the power voltage amplitude. In other embodiments, the duty cycle of the square wave may be adjusted based on a bathtub curve (or inverted bathtub curve). For example when the power voltage amplitude becomes very small, in one embodiment the duty cycle of the square wave may be adjusted to be very low in order to approximate a synchronous rectification mode.

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk;
a head actuated over the disk;
a spindle motor configured to rotate the disk, wherein the spindle motor comprises a plurality of windings; and
control circuitry configured to unload the head during a power failure by at least:
generating a periodic signal;
shorting the windings of the spindle motor based on the periodic signal in order to generate a power voltage;
measuring an amplitude of the power voltage during at least part of the unload; and
adjusting the periodic signal based on the measured amplitude of the power voltage.

2. The data storage device as recited in claim 1, wherein the periodic signal comprises a square wave.

3. The data storage device as recited in claim 2, wherein the control circuitry is further configured to adjust the periodic signal by adjusting a duty cycle of the periodic signal.

4. The data storage device as recited in claim 3, wherein the control circuitry is further configured to adjust the periodic signal by increasing the duty cycle of the periodic signal as the measured amplitude of the power voltage decreases.

5. The data storage device as recited in claim 2, wherein the control circuitry is further configured to adjust the periodic signal by adjusting a period of the periodic signal.

6. The data storage device as recited in claim 2, wherein the control circuitry is further configured to adjust the periodic signal by decreasing the period of the periodic signal as the measured amplitude of the power voltage decreases.

7. The data storage device as recited in claim 1, wherein the control circuitry is further configured to first adjust the periodic signal when the measured amplitude of the power voltage falls below a first threshold.

8. The data storage device as recited in claim 7, wherein the control circuitry is further configured to second adjust the periodic signal when the measured amplitude of the power voltage falls below a second threshold lower than the first threshold.

9. The data storage device as recited in claim 7, wherein the control circuitry is further configured to:
generate a regulated voltage based on the power voltage; and
generate the first threshold based on the regulated voltage.

10. A method of operating a data storage device, the method comprising:
unloading a head actuated over a disk during a power failure by at least:
generating a periodic signal;
shorting windings of a spindle motor based on the periodic signal in order to generate a power voltage, wherein the spindle motor is configured to rotate the disk;
measuring an amplitude of the power voltage during at least part of the unload; and
adjusting the periodic signal based on the measured amplitude of the power voltage.

11. The method as recited in claim 10, wherein the periodic signal comprises a square wave.

12. The method as recited in claim 11, wherein adjusting the periodic signal comprises adjusting a duty cycle of the periodic signal.

13. The method as recited in claim 12, wherein adjusting the periodic signal comprises increasing the duty cycle of the periodic signal as the measured amplitude of the power voltage decreases.

14. The method as recited in claim 11, wherein adjusting the periodic signal comprises adjusting a period of the periodic signal.

15. The method as recited in claim 11, wherein adjusting the periodic signal comprises decreasing the period of the periodic signal as the measured amplitude of the power voltage decreases.

16. The method as recited in claim 10, further comprising first adjusting the periodic signal when the measured amplitude of the power voltage falls below a first threshold.

17. The method as recited in claim 16, further comprising second adjusting the periodic signal when the measured amplitude of the power voltage falls below a second threshold lower than the first threshold.

18. The method as recited in claim 16, further comprising:
generating a regulated voltage based on the power voltage; and
generating the first threshold based on the regulated voltage.

19. A device comprising:
an electric motor comprising a plurality of windings configured to rotate the electric motor; and
control circuitry configured to:
generate a periodic signal;
short the windings of the electric motor based on the periodic signal in order to generate a power voltage;
measuring an amplitude of the power voltage during at least part of the unload; and
adjusting the periodic signal based on the measured amplitude of the power voltage.

20. The device as recited in claim 19, wherein the periodic signal comprises a square wave.

21. The device as recited in claim 20, wherein the control circuitry is further configured to adjust the periodic signal by adjusting a duty cycle of the periodic signal.

22. The device as recited in claim 21, wherein the control circuitry is further configured to adjust the periodic signal by increasing the duty cycle of the periodic signal as the measured amplitude of the power voltage decreases.

23. The device as recited in claim 20, wherein the control circuitry is further configured to adjust the periodic signal by adjusting a period of the periodic signal.

24. The device as recited in claim 20, wherein the control circuitry is further configured to adjust the periodic signal by decreasing the period of the periodic signal as the measured amplitude of the power voltage decreases.

25. The device as recited in claim 19, wherein the control circuitry is further configured to first adjust the periodic signal when the measured amplitude of the power voltage falls below a first threshold.

26. The device as recited in claim 25, wherein the control circuitry is further configured to second adjust the periodic signal when the measured amplitude of the power voltage falls below a second threshold lower than the first threshold.

27. The device as recited in claim 25, wherein the control circuitry is further configured to:
generate a regulated voltage based on the power voltage; and
generate the first threshold based on the regulated voltage.

* * * * *